United States Patent
Douglas

(10) Patent No.: US 7,858,951 B1
(45) Date of Patent: Dec. 28, 2010

(54) SKEW CHICANE BASED BETATRON EIGENMODE EXCHANGE MODULE

(75) Inventor: David Douglas, Yorktown, VA (US)

(73) Assignee: Jefferson Science Associates, LLC, Newport News, VA (US)

( * ) Notice: Subject to any disclaimer, the term of this patent is extended or adjusted under 35 U.S.C. 154(b) by 829 days.

(21) Appl. No.: 11/880,222

(22) Filed: Jul. 20, 2007

(51) Int. Cl.
*H01J 3/12* (2006.01)

(52) U.S. Cl. ............................... 250/396 ML; 315/505
(58) Field of Classification Search ................ 315/3–5, 315/5.13, 5.14, 5.34, 5.41, 500–507; 250/396 ML, 250/492.1, 492.3
See application file for complete search history.

(56) References Cited

U.S. PATENT DOCUMENTS

| 4,623,847 | A  | * | 11/1986 | Anderberg et al. | .......... 315/505 |
| 4,930,130 | A  | * | 5/1990 | Burke | ............................. 372/2 |
| 6,753,662 | B1 | * | 6/2004 | Krafft | ......................... 315/505 |
| 6,885,008 | B1 | * | 4/2005 | Douglas et al. | ....... 250/396 ML |
| 6,956,218 | B1 | * | 10/2005 | Douglas | .............. 250/396 ML |

* cited by examiner

*Primary Examiner*—Jacob Y Choi
*Assistant Examiner*—Jimmy T Vu

(57) ABSTRACT

A skewed chicane eigenmode exchange module (SCEEM) that combines in a single beamline segment the separate functionalities of a skew quad eigenmode exchange module and a magnetic chicane. This module allows the exchange of independent betatron eigenmodes, alters electron beam orbit geometry, and provides longitudinal parameter control with dispersion management in a single beamline segment with stable betatron behavior. It thus reduces the spatial requirements for multiple beam dynamic functions, reduces required component counts and thus reduces costs, and allows the use of more compact accelerator configurations than prior art design methods.

4 Claims, 2 Drawing Sheets

SKEW CHICANE BASED BETATRON EIGENMODE EXCHANGE MODULE

The United States of America may have certain rights to this invention under Management and Operating Contract DE-AC05-06OR23177 from the United States Department of Energy.

FIELD OF THE INVENTION

The present invention relates to high power free electron lasers and more particularly to apparatus and methods for reducing the foot print of such devices by combining in a single beamline segment that performs the functionalities of a skew quad eigenmode exchange module and a magnetic chicane.

BACKGROUND OF THE INVENTION

The beam breakup instability (BBU) and THz radiation-driven thermal loading of free electron laser (FEL) mirrors are well-characterized performance limitations in high power free electron laser (FEL) systems. Such systems are, further, often based on topologies that use laser optical elements embedded within the driver accelerator footprint, necessitating the use of magnetic dipole elements to separate the electron drive beam from the optical mode axis and direct it away from and/or around said optical components. Momentum compaction managed systems used for the temporal compression of charged particle beam bunches also frequently use similar magnetic transport—such as a chicane—to provide path-length/momentum correlations needed for the bunch compression process.

The accelerator transport elements required to address each of these issues have, in the prior art, been of separate functionality and have been installed in separate regions of the driver accelerator. BBU has been effectively addressed through the use of a skew-quad eigenmode exchange module (SQEEM [D. Douglas, "A Skew-Quad Eigenmode Exchange Module (SQEEM) for the FEL Upgrade Driver Backleg Transport", JLAB-TN-04-016, 12 May 2004]) wherein a system of five symmetrically arrayed skew quadrupoles are powered in three families, thereby providing a complete and betatron stable cross-coupling of the transverse motion. THz loading of mirrors has been effectively suppressed through the use of a magnet dipole chicane between the wiggler and the downstream FEL optical element as described in a copending patent application. In the prior art, interferences between electron drive beam and optical systems are often resolved through the use of an additional magnetic chicane, wherein the electron beam is directed around the optical elements under consideration and/or merged with or separated from the optical mode as is required. Similarly, beam bunching can be provided through the appropriate use of a dipole magnet chicane.

Each of these systems individually requires approximately the same spatial footprint (for a 100 MeV electron beam, this would be of the order of a few to 10s of m$^2$); their use via independent installation thus subsumes some factor as large as two (or more) times as much space as would a more integrated approach. Thus there is a need to somehow consolidate these functionalities so as to reduce the footprint of the overall installation.

OBJECT OF THE INVENTION

It is therefore an object of the present invention to provide a method and apparatus for reducing the overall footprint of free electron lasers by consolidating the functionalities of skew-quad eigenmode exchange modules and a magnet dipole chicane between the wiggler and the downstream FEL optical element into a single beamline segment that performs the functionalities of a skew quad eigenmode exchange module and a magnetic chicane simultaneously.

SUMMARY OF THE INVENTION

The present invention describes a skewed chicane eigenmode exchange module (SCEEM) that combines in a single beamline segment the separate functionalities of a skew quad eigenmode exchange module and a magnetic chicane. This module allows the exchange of independent betatron eigenmodes, alters electron beam orbit geometry, and provides longitudinal parameter control with dispersion management in a single beamline segment with stable betatron behavior. It thus reduces the spatial requirements for multiple beam dynamic functions, reduces required component counts and thus reduces costs, and allows the use of more compact accelerator configurations than prior art design methods. This implementation: a) deflects the radiation away from the mirror, b) debunches the electron beam at any subsequent element between wiggler and optical component (thereby alleviating radiation loading) and c) further separates the radiation source from the optical element, reducing loading as 1/(distance)$^2$.

DESCRIPTION OF THE DRAWINGS

FIG. 1 is a schematic representation of a four dipole chicane geometry in.

DETAILED DESCRIPTION

Figure 7:
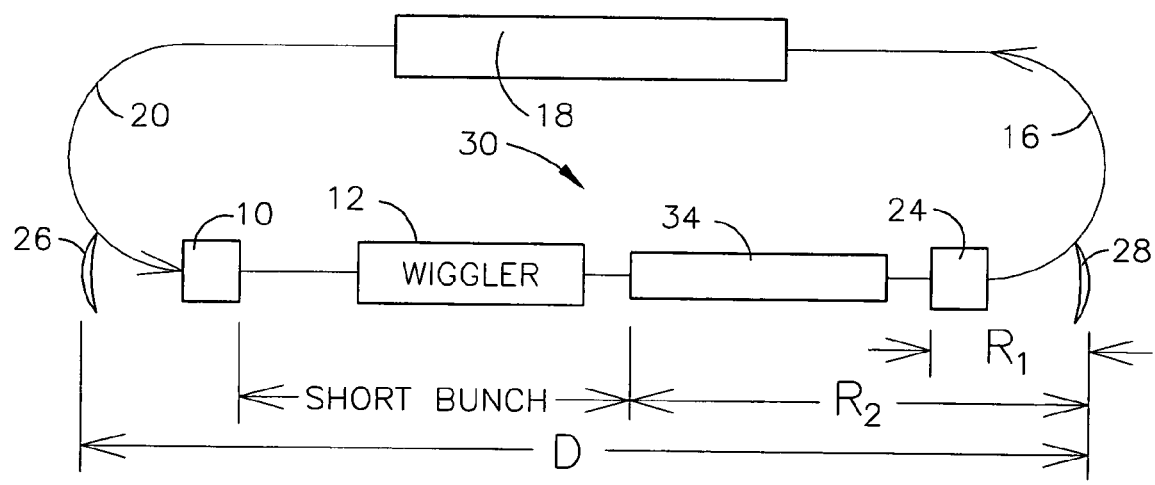
FIG. 7 is a schematic representation of an energy resolving Linac in accordance with the present invention.

Referring now to the accompanying drawings, FIG. 7 depicts a schematic diagram of a conventional energy resolving Linac (ERL) in accordance with the present invention. In this Figure, the Linac comprises an injected electron drive beam 16 that is injected into linear accelerator 18 to produce electron beam 20.

After passage through wiggler 12, the transport system again may (though not necessarily will) be used to adjust electron drive beam 16 transverse properties, but the electron bunch remains longitudinally short until it reaches the first bending magnet 24 of the energy recovery recirculation/energy compression system of the ERL.

In this system topology, the system geometric footprint is dominated by the optical cavity length D; the final magnetic bending dipole 10 upstream of wiggler 12 and initial bending dipole 24 downstream of wiggler 12 are spatially adjacent to the mirrors 26 and 28 that define the optical cavity 30. According to the present invention, as described below, the introduction of a skew-chicane based betatron eigenmode exchange module 34 downstream of wiggler 12 and upstream of initial bending dipole 24 solves the previously describe problems while not enlarging the foot print of the ERL significantly.

Superconducting accelerators are susceptible to a variety of problems because the electrical resistance of the superconductor is nearly zero. In particular, the electron beam can deposit energy in the accelerator that will kick later electrons around—and these will cause more energy to be deposited, causing worse kicks, and more deposition of energy . . . in an unstable feedback loop. This effect is called the "beam break-up instability".

One way to suppress this instability is to design a superconductor so that it won't respond to the electron beam—but this can't be done for all cases. Other methods are therefore often needed—and these usually involve doing something to the electron beam. One trick of this type is called a "phase space rotator" or "phase space reflector". This is a collection of magnets that are specially designed to make all horizontal motion become vertical, and all vertical motion become horizontal. Because the beam break-up instability is a feedback loop—a kick becomes a displacement that becomes a bigger kick that becomes a bigger displacement—the effect only occurs if the beam moves in a way to which the accelerator can respond. A phase space reflector or rotator makes the beam response to the kick occur in the "wrong" direction, i.e. so the accelerator won't respond to the beam displacement, and the feedback loop is broken.

In view of the need defined above, we have developed a means of integrating the function of a SQEEM with that of a magnetic chicane. In this system, the "skew chicane eigenmode exchange module" (SCEEM), advantage is taken of the focusing provided by magnetic dipoles to provide a betatron stable solution in both transverse betatron planes. This focusing/bending system not only completely and stably exchanges the horizontal and vertical betatron eigenmodes in a manner preserving decoupling of initially decoupled transverse motion, but also will provides the same temporal/compactional, achromatic momentum dispersion, and geometric offset properties as a conventional chicane. It may thus be used as an integrated design module simultaneously addressing two or more of the aforementioned issues. It will, inherently address BBU via its coupling properties. In addition, its geometry can be used to alleviate interferences amongst the drive beam and optical mode and/or to deflect THz radiation, and/or provide magnetic bunch compression for lasing, energy compression, and THz management. Because of this multiple, integrated functionality, the SCEEM will significantly reduce the accelerator footprint, assisting in the design of compact accelerator drivers for various applications (such as FELs). Stated differently, the apparatus of the present invention combines functions by tilting the chicane and adding a few extra magnets—the so-called "skew quads", i.e. standard "quadrupoles"—generic beam line magnets, and tilting them by 45 degrees. By tilting the chicane and adding an extra pair of skew quadrupoles, bunch lengthening is obtained from the chicane, horizontal motion is put into the vertical plane, and the vertical motion put into the horizontal plane, which will disable the feedback mechanism driving the beam breakup instability. It takes up far less space than two separate systems, but provides the function of both.

A symmetric magnetic chicane has well-defined transverse focusing, momentum dispersion, and longitudinal compaction. For example, a chicane based entirely on rectangular dipoles appears to be a drift in the bending plane, a sequence of focusing lenses (the dipole pole faces) in the non-bending plane, is dispersion suppressed to all orders, and has well-defined momentum compactions. If the pole faces of the first and final dipoles are symmetrically adjusted, the dispersive and compaction properties are unaltered, but the focusing can be modified to provide betatron stability in both planes. If this is done, and the dipole chicane rotated by 45° around the axis of the incoming/outgoing orbit, the system transport appears equivalent to that provided by a symmetrical array of skew quadrupoles—much like that of a standard SQEEM. Internally, however, it retains (in the magnetic mid-plane) all the usual geometric, dispersive, and compactional properties—thereby retaining the advantages provided by a conventional chicane. Dispersion-independent control over the focusing properties is provided by the chosen values of the first and final pole face rotation angles and by the separation of center dipoles (if a 4 dipole chicane is used; the separation of any dipoles at locations of zero dispersive slope can be similarly varied in other geometries. These are typically at the location of reflective symmetry). Integrated control over focusing, dispersion, and compactional properties is provided by the chosen values of the bend angles and radii, and the separation of the first and final bends from the center bends.

Figure 1:
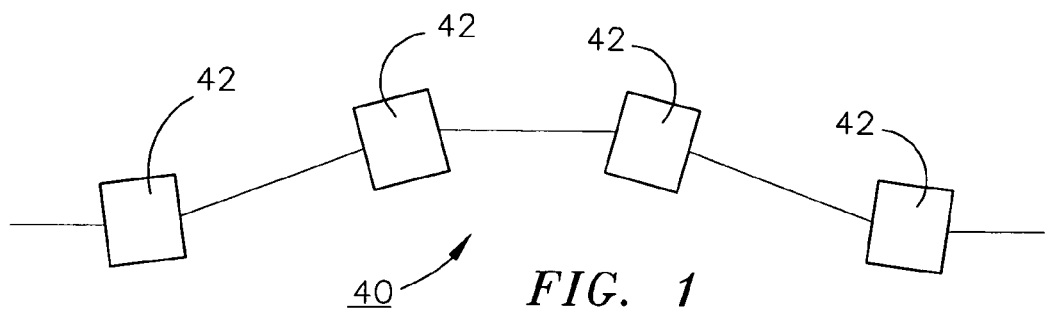

As an example, we have designed a simple SCEEM by generating a symmetric four dipole chicane (FIG. 1). By simultaneously altering all four bend angles (and linking to their values the pole face angles of the interior pole faces A—the incidence angle is set to ½ the bend angle) and separately simultaneously altering the exterior bend faces B, we can render the focusing properties of the chicane equivalent to those of a symmetrical array of three normal quadrupoles. The resulting system is schematically presented in FIG. 2. By rotating this system by 45° as described above, we obtain a transport that is the focal equivalent of a symmetric array of three skew quads. By the addition of two additional skew quads, we may (by numerical optimization of the quadrupole excitations and the various bend angles as previously described) obtain the optical equivalent of a SQEEM, with the geometric, dispersive, and compactional properties of the chicane intact.

After fitting on the bending angles, the orientations of the pole faces, and the skew quadrupole excitation as described above, the transfer matrix for the skewed system is as follows in Table 1.

TABLE 1

6 × 6 linear transport matrix for example SCEEM

| | | | | | |
|---|---|---|---|---|---|
| −0.2255141E−16 | 0.2806999E−15 | 0.4628336E+00 | 0.1634625E+01 | 0.0000000E+00 | −0.3666051E−16 |
| −0.1006140E−15 | −0.2498002E−15 | −0.4807128E+00 | 0.4628336E+00 | 0.0000000E+00 | 0.1109163E−16 |
| 0.4628336E+00 | 0.1634625E+01 | −0.1595946E−15 | −0.5273559E−15 | 0.0000000E+00 | −0.8518102E−17 |
| −0.4807128E+00 | 0.4628336E+00 | 0.1110223E−15 | −0.2220446E−15 | 0.0000000E+00 | 0.1843540E−17 |
| 0.1110223E−15 | 0.0000000E+00 | 0.8326673E−16 | −0.2775558E−16 | 0.1000000E+01 | −0.1190754E+00 |
| 0.0000000E+00 | 0.0000000E+00 | 0.0000000E+00 | 0.0000000E+00 | 0.0000000E+00 | 0.1000000E+01 |

It should be observed that the off-diagonal submatrices are identical and betatron stable, as in the SQEEM, the system is achromatic, and has a negative compaction ($M_{56}$) as expected for a chicane.

It is further noted that in the general SCEEM:

1) there is considerable tuning range in the module. By further varying dipole lengths, separations, and element to element drifts, SCEEM 2×2 submatrices can be made equal to that of a quarter-integer FODO transport with (over some range) user-specified "matched" betatron function. The result for the example system is given in Table 2 below.

Figure 4:
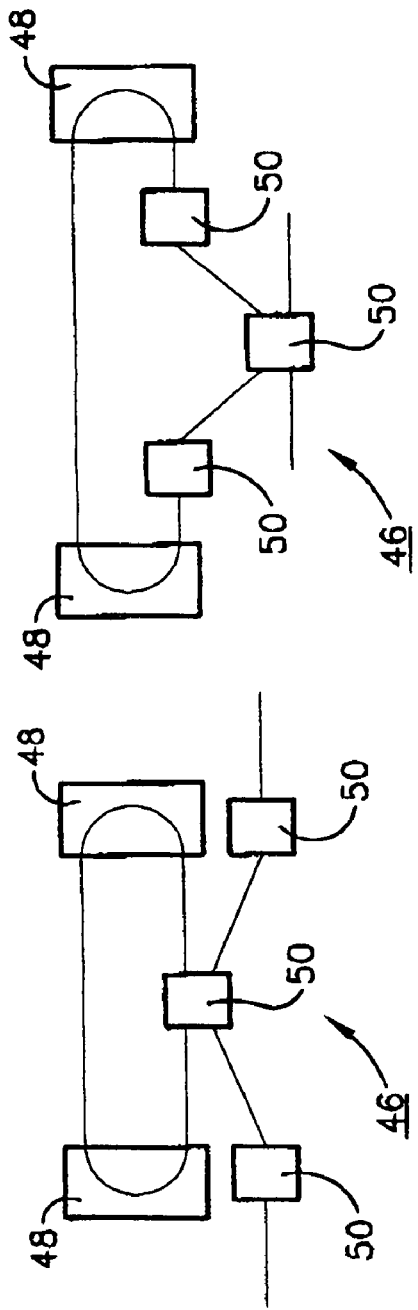
FIG. 4 is a representation of two varieties of recirculated chicanes.
Figure 5:
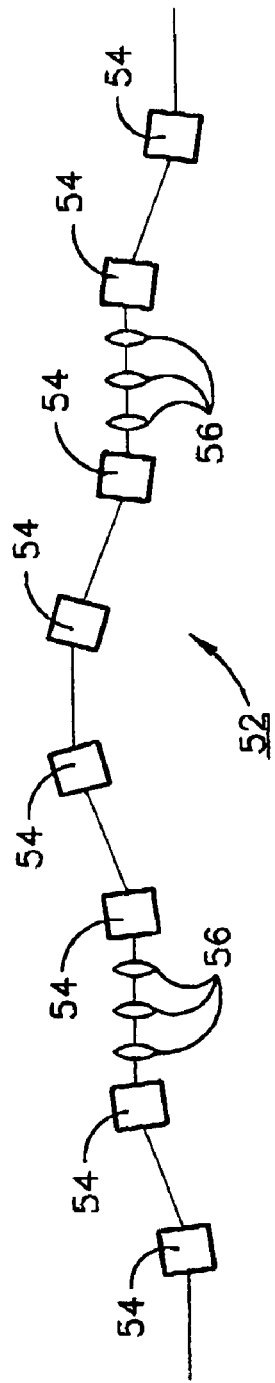
FIG. 5 is a schematic representation of a staircase pair as described herein.
Figure 6:
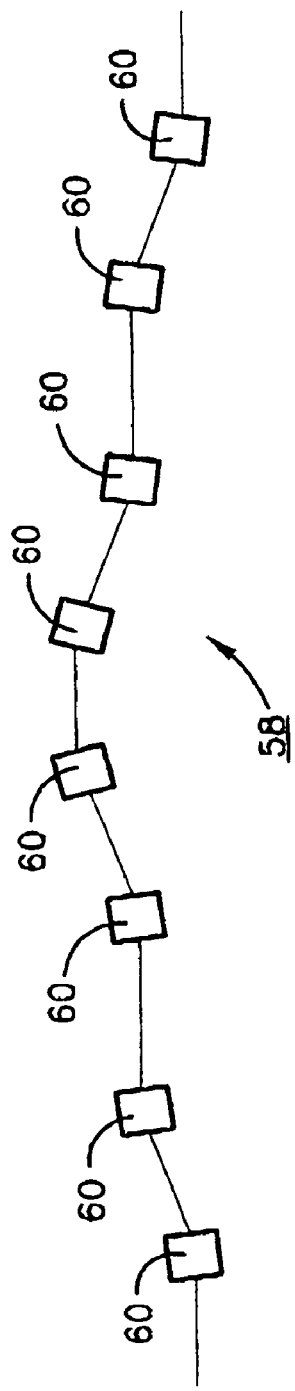
FIG. 6 is a schematic representation of nested chicanes as described herein.

2) Given this degree of design flexibility, it is indeed possible that the skew quadrupole pair may be unnecessary and all focusing may be accommodated within the chicane, and 3) the "chicane" that is skewed need not be a simple symmetric chicane, but can in fact be a more complex bending transport such as a three-dipole chicane, multiple embedded, nested, or cascaded chicanes, various arrangements of staircase modules or recirculated chicanes etc. as depicted in attached FIGS. 4-6.

Figure 2:
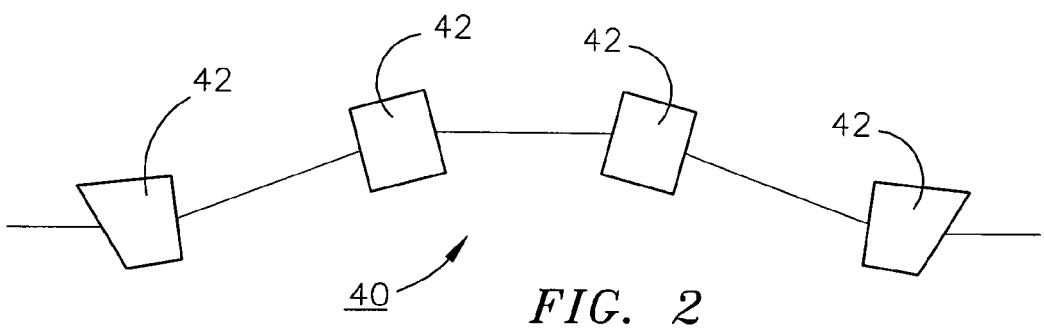
FIG. 2 is schematic representation of a betatron-stable chicane.

Table 2 shows the results achievable using as an example a SCEEM with fitting using bend angles, pole face orientations, and skew quad strengths as described above, and quad-to-dipole spacing. Examples are shown (but not restricted to those) in FIG. 2 are now equivalent to quarter-betatron-wavelength transport There has thus been described, a skewed chicane eigenmode exchange module (SCEEM) that combines in a single beamline segment the separate functionalities of a skew quad eigenmode exchange module and a magnetic chicane. This module allows the exchange of independent betatron eigenmodes, alters electron beam orbit geometry, and provides longitudinal parameter control with dispersion management in a single beamline segment with stable betatron behavior. It thus reduces spatial requirements for multiple beam dynamic functions, reduces required component counts and thus reduces costs, and allows the use of more compact accelerator configurations than prior art design methods.

As the invention has been described, it will be apparent to those skilled in the art that the same may be varied in many ways without departing from the spirit and scope of the invention. Any and all such modifications are intended to be included within the scope of the appended claims.

What is claimed is:

1. A method for reducing the spatial requirements for multiple beam dynamic functions, reduces required component counts and thus reduces costs, and allows the use of more compact accelerator configurations in an energy recovering linac that includes an optical cavity comprising a pair of opposed upstream and downstream mirrors, an initial bending dipole and a wiggler upstream of the intial bending dipole, said method comprising: introducing between the wiggler

| | | | | | |
|---|---|---|---|---|---|
| 0.2642201E−15 | 0.7766655E−15 | 0.4098047E−15 | 0.1535669E+01 | 0.0000000E+00 | −0.1566927E−16 |
| −0.5724587E−16 | 0.1771993E−15 | −0.6511820E+00 | −0.2584738E−15 | 0.0000000E+00 | −0.2189028E−16 |
| −0.1665335E−15 | 0.1535669E+01 | 0.3374037E−15 | −0.1665335E−15 | 0.0000000E+00 | −0.1144222E−16 |
| −0.6511820E+00 | 0.3365364E−15 | 0.1734723E−15 | 0.1665335E−15 | 0.0000000E+00 | −0.2464286E−16 |
| −0.5551115E−16 | 0.0000000E+00 | −0.1387779E−16 | 0.1110223E−15 | 0.1000000E+01 | −0.1604705E+00 |
| 0.0000000E+00 | 0.0000000E+00 | 0.0000000E+00 | 0.0000000E+00 | 0.0000000E+00 | 0.1000000E+01 |

As is apparent from this example, considerable design and beam dynamic flexibility is provided, as is a significant reduction in the spatial requirements imposed by the available beam optical functionality.

Figure 3:
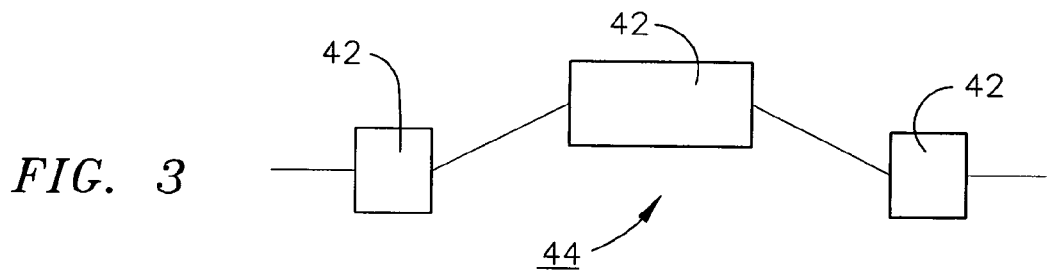
FIG. 3 is a schematic representation of a three dipole chicane appropriate for use in accordance with the present invention.

FIGS. 1-6 show skew chicane geometries suitable for use in the consolidated apparatus described herein. FIGS. 1 and 2 depict a useful chicane 40 comprising four dipoles 42. FIG. 3 depicts a three dipole 42 chicane 44, FIG. 4 depicts two variants of a recirculated chicane 46 comprising a pair of reversing magnets 48 and dipoles 50, FIG. 5 depicts a staircase pair 52 comprising a series of dipoles 52 and lenses 56 and FIG. 6 depicts a nested chicane 58 comprising dipoles 60 as can be applied for the implementation of the present invention. Each of the structures depicted in FIGS. 1-6 is well known in the art and readily fabricated and applied by those skilled in the art.

and the initial bending dipole a skewed chicane eigenmode exchange module.

2. The method of claim 1 wherein the skewed chicane eigenmode exchange module comprises: a four dipole chicane; a three dipole chicane; a recirculated chicane; a staircase pair or a nested chicane.

3. An energy recovering linac comprising a final bending dipole, a wiggler, an initial bending dipole and an optical cavity comprising a pair of opposed upstream and downstream mirrors and further including between the wiggler and the initial bending dipole, a skewed chicane eigenmode exchange module.

4. The energy recovering linac of claim 3 wherein the skewed chicane eigenmode exchange module comprises: a four dipole chicane; a three dipole chicane; a recirculated chicane; a staircase pair or a nested chicane.

* * * * *